United States Patent
Eustache

[11] Patent Number: 5,809,610
[45] Date of Patent: Sep. 22, 1998

[54] MOTOR VEHICLE WINDOW WIPER DEVICE

[75] Inventor: Jean-Pierre Eustache, Antony, France

[73] Assignee: Valeo Systems d'Essuyage, La Verriere, France

[21] Appl. No.: 875,962
[22] PCT Filed: Nov. 29, 1996
[86] PCT No.: PCT/FR96/01896
§ 371 Date: Aug. 7, 1997
§ 102(e) Date: Aug. 7, 1997
[87] PCT Pub. No.: WO97/20717
PCT Pub. Date: Jun. 12, 1997

[30] Foreign Application Priority Data
Dec. 7, 1995 [FR] France .................................. 95 14671

[51] Int. Cl.[6] .................................................. B60S 1/34
[52] U.S. Cl. .................... 15/250.21; 15/250.31; 74/96; 74/18.1; 74/600; 74/42; 384/192; 384/255
[58] Field of Search ............... 15/250.21, 250.3, 15/250.202, 250.13, 250.31, 250.34; 74/47, 42, 99 R, 102, 104, 600, 602, 18.1, 96; 384/192, 206, 255

[56] References Cited

U.S. PATENT DOCUMENTS

| | | | |
|---|---|---|---|
| 2,412,319 | 12/1946 | Carey | 15/250.21 |
| 2,533,963 | 12/1950 | Sacchini | 15/250.21 |
| 2,827,653 | 3/1958 | Dyer et al. | 15/250.21 |
| 2,878,506 | 3/1959 | Krohm | 15/250.21 |
| 5,186,064 | 2/1993 | Matsumoto et al. | 15/250.3 |
| 5,647,085 | 7/1997 | Edele et al. | 15/250.21 |

FOREIGN PATENT DOCUMENTS

| | | |
|---|---|---|
| 2 625 715 | 7/1989 | France . |
| 33 29 146 | 2/1985 | Germany . |
| 43 24 783 | 1/1995 | Germany . |
| 2 213 709 | 8/1989 | United Kingdom . |

Primary Examiner—Gary K. Graham

[57] ABSTRACT

A motor vehicle window wiper device with a wiper arm at the top end of a drive shaft rotatably mounted in a fixed bearing by means of two ball joints of which at least one is off-center relative to the axis of the drive shaft so that the angle of the drive shaft axis to the plane of the window varies when said shaft is rotated about said axis.

12 Claims, 5 Drawing Sheets

MOTOR VEHICLE WINDOW WIPER DEVICE

BACKGROUND OF THE INVENTION

This invention relates to a screen wiper apparatus for a motor vehicle glass.

More particularly, the invention relates to screen wiper apparatus for a motor vehicle glass, of the type in which a screen wiper extends longitudinally in a direction parallel to the general plane of the glass to be swept, being of the type in which the screen wiper is mounted at the upper end of a spindle for driving it in alternating rotary wiping movement, the axis of the spindle being substantially at right angles to the general plane of the glass, being also of the type in which the drive spindle is mounted for rotation in a bearing which is fixed with respect to the vehicle, and being further of the type in which the drive spindle is driven in rotation by a crank which lies in a plane substantially at right angles to the axis of the spindle, and which is coupled through a linkage to a motorised reduction gear unit.

Such an apparatus enables the glass to be swept by a wiper blade strip of flexible elastomeric material which is held against the windscreen by a wiper blade carried by a screen wiper arm.

In this connection, motor vehicle glasses, and windscreens in particular, are generally curved, so that it is necessary for the screen wiper blade to have an articulated structure that forces the wiping strip into contact with the glass over its whole length.

The articulated structure of the blade also enables the contact pressure to be substantially homogeneous over the whole length of the wiping strip, and for this purpose it is deformable in a plane which is substantially at right angles to the glass to be swept, and the articulated structure holds the wiping strip in its plane of deformation by means of clips.

However, when the screen wiper blade travels over the glass in its alternating rotary wiping movement, the plane of deformation of its articulated structure does not remain strictly perpendicular to the plane of the glass being swept, due to the curvature of the glass, so that the wiping strip is in contact with the glass at an angle which varies according to the position of the screen wiper.

Now it has become apparent that such an inclination of the wiping strip is severely detrimental to the wiping quality of the screen wiper blade.

One particularly unfavourable case is the situation in which, where the glass is a motor vehicle windscreen, the screen wiper is so designed as to wipe over a rearwardly curved lateral end portion of the windscreen, finishing substantially parallel to the side support riser of the windscreen. The angle of inclination of the wiping strip with respect to the glass is then large, and can be detrimental to the effectiveness of the screen wiper in that zone.

BRIEF SUMMARY OF THE INVENTION

With a view to providing a solution to this problem, the invention proposes a screen wiper of the type defined above, characterised in that the drive spindle is mounted for rotation in the bearing by means of two spherical articulations, in that at least one of the spherical bearings is so arranged that its centre of rotation is eccentric with respect to the axis of the drive spindle, and in that the spindle is fixed to an internal spherical bush of the eccentric articulation for rotation with it, so as to cause the inclination of the axis of the drive spindle to vary with respect to the plane of the glass when the spindle is driven in rotation about its axis.

In accordance with other features of the invention:

one of the spherical articulations is so arranged that its centre of rotation is coincident with the axis of the drive spindle, so as to constitute the centre of the movement of inclination of the drive spindle;

the bearing is arranged against an internal face of a bodywork panel of the vehicle, through which the upper end portion of the drive spindle passes, and the spherical articulation the centre of which is coincident with the axis of the spindle is disposed axially on the spindle close to the bodywork panel, at an upper end of the bearing;

at least one of the axial ends of the bearing is sealingly closed off transversely by an annular seal having a flexible membrane, the outer periphery of which is fixed on the axial end of the bearing with its inner periphery co-operating sealingly with the drive spindle;

the bearing is substantially tubular, and each of the spherical articulations includes an outer guiding ring fixed on an internal cylindrical surface of the bearing, together with an inner ring fixed to the spindle;

the internal spherical bush of at least one articulation has an axial extension piece which is directed towards the nearest axial end of the bearing, and the membrane seal bears sealingly on the axial extension piece;

the crank for driving the spindle in rotation is arranged on the spindle axially below the bearing;

the bearing is closed at both axial ends by a membrane seal;

the crank for driving the spindle in rotation is arranged on the spindle axially between the upper spherical articulation and the bodywork panel;

the bearing is closed at its lower axial end by a transverse wall.

BRIEF DESCRIPTION OF THE DRAWINGS

Further features and advantages of the invention will appear on a reading of the following detailed description, for an understanding of which reference is made to the attached drawings, in which.

DETAILED DESCRIPTION OF THE INVENTION

Figure 1:
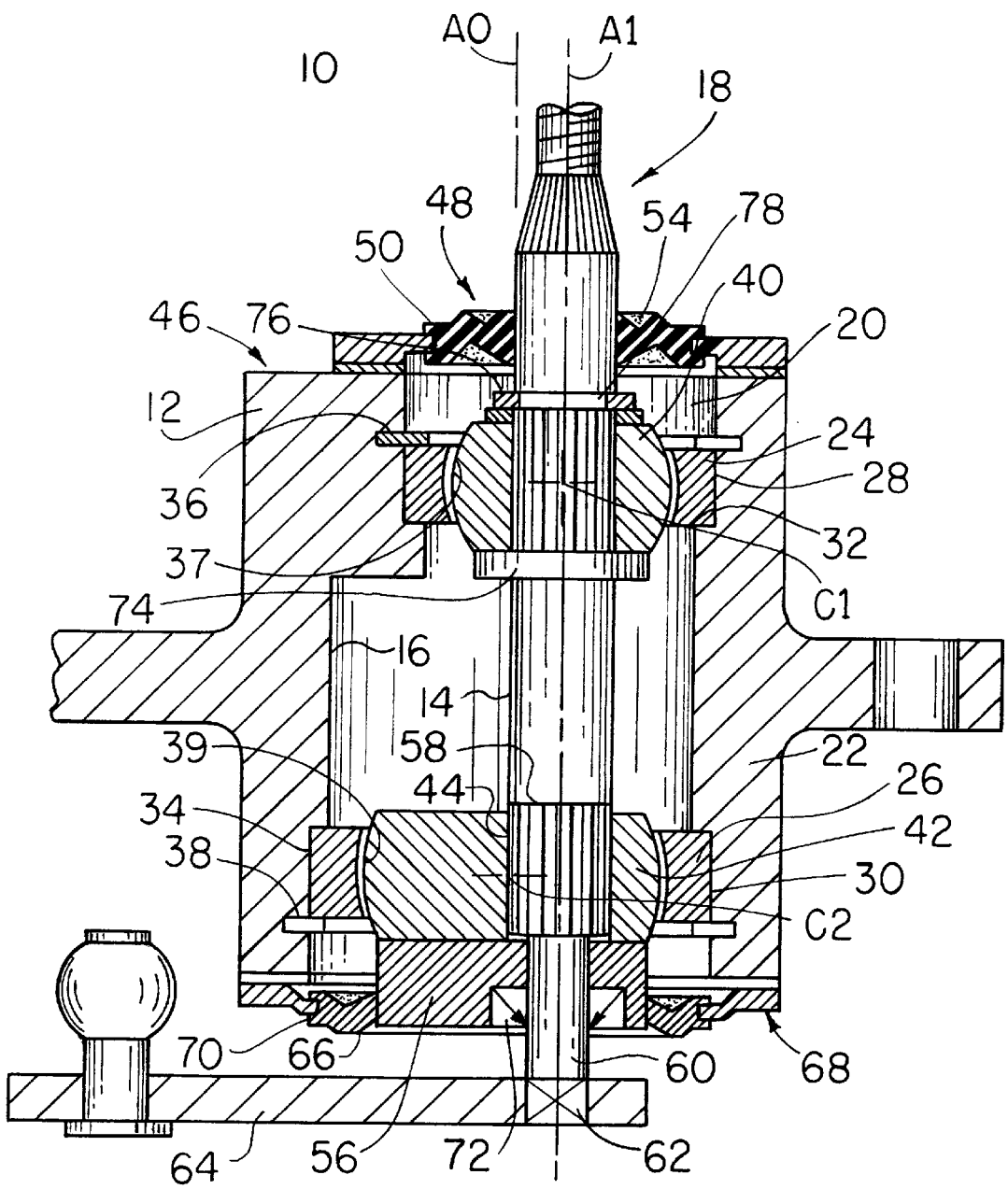
FIGS. 1 and 2 are two views in axial cross section in two directions at right angles to each other, showing a first embodiment of a screen wiper bearing in accordance with features of the invention.
Figure 2:
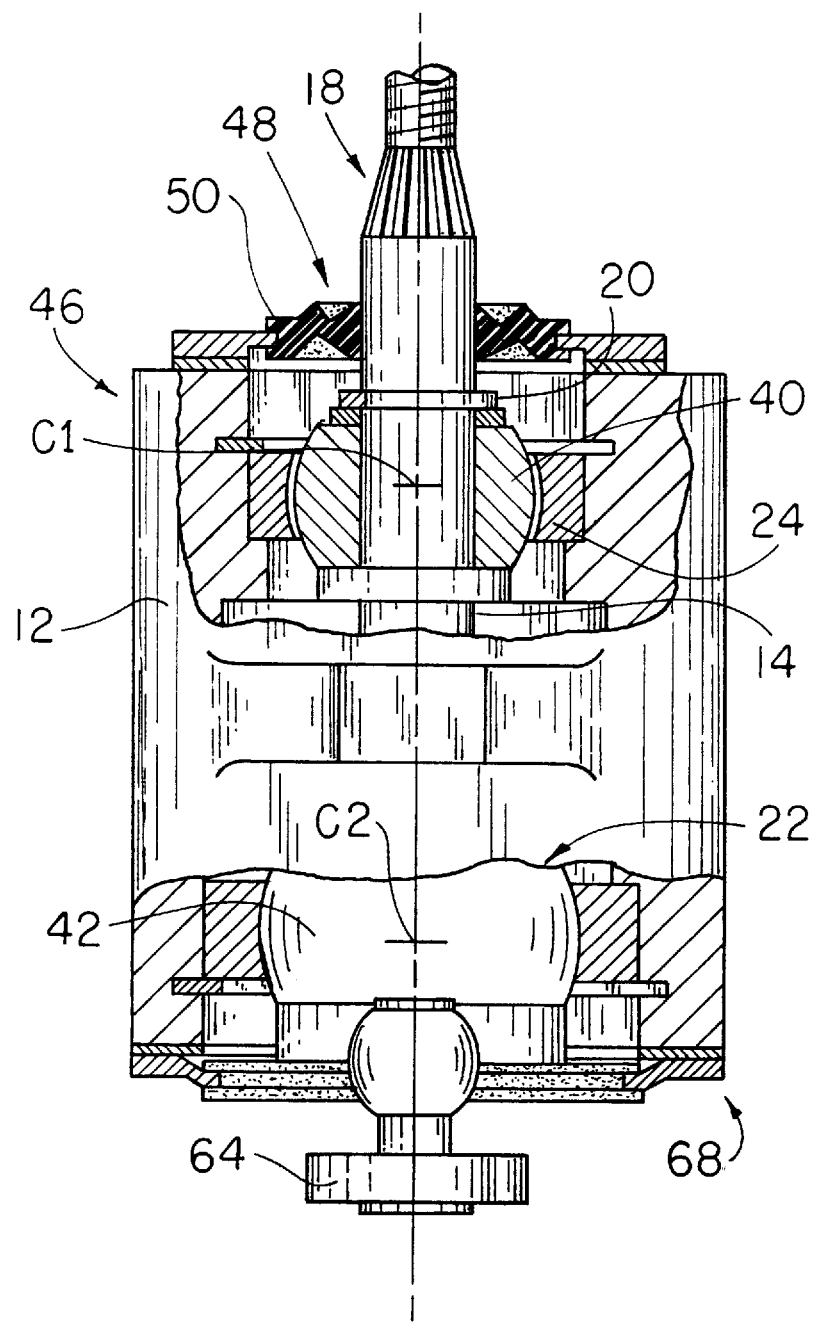
Figure 3:
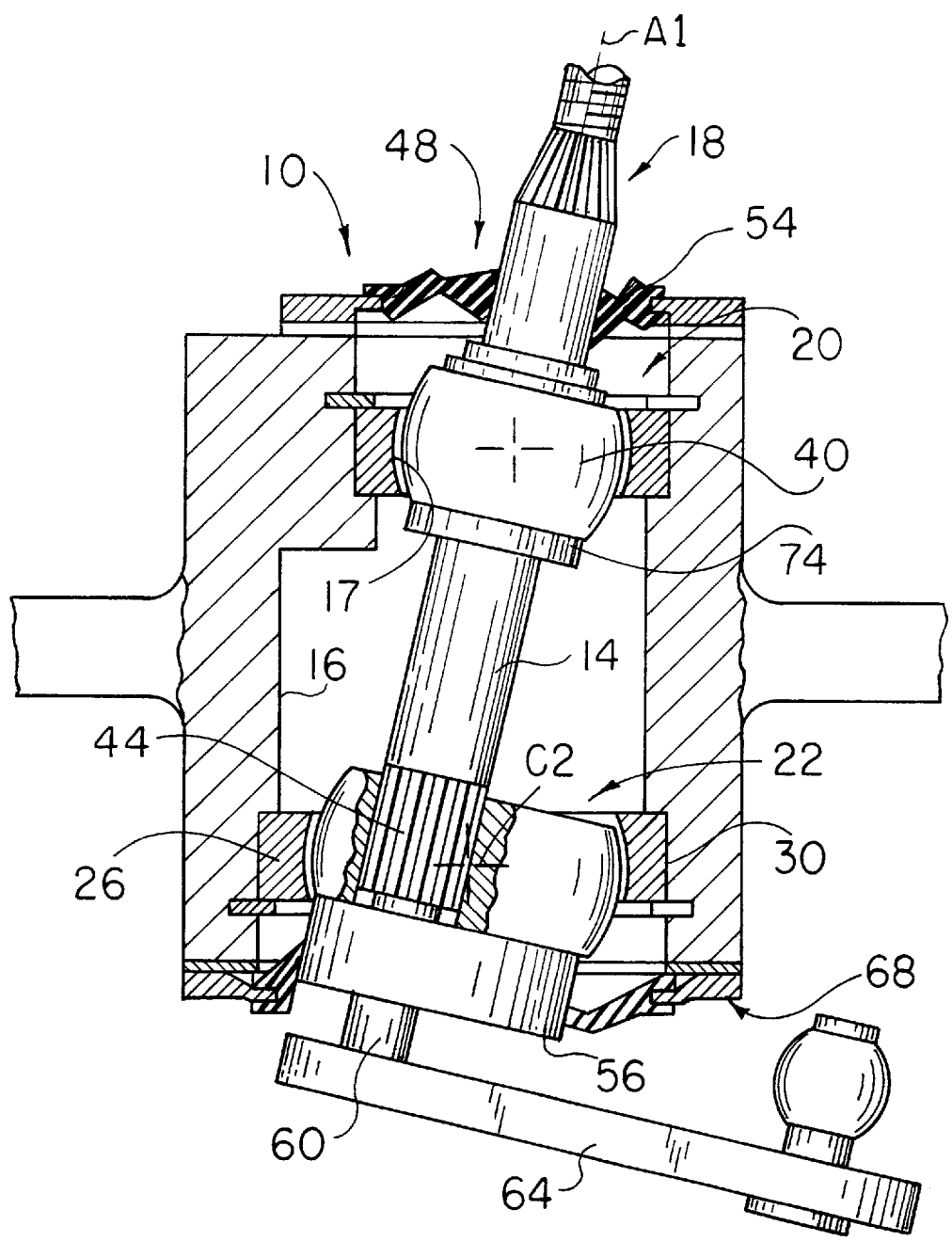
FIG. 3 is a view similar to that in FIG. 1, in which the axis of the drive spindle has pivoted with respect to its position shown in FIG. 1.

FIGS. 1 to 3 show a bearing 10 for a wiping apparatus for a motor vehicle glass.

The bearing 10 comprises a bearing body 12 which is substantially tubular with an axis A0, and which is arranged substantially at right angles and in facing relationship with the inner face of a bodywork panel (not shown) which lies generally at the same level as the lower edge of the glass.

A drive spindle 14 with an axis A1 is mounted axially for rotation in the internal bore 16 of the bearing body 12, and has an upper end portion 18 which extends through an aperture in the bodywork panel to the outside of the vehicle, and on which a screen wiper is adapted to be fixed.

The spindle 14 is mounted in the bearing body 12 by means of two spherical articulations, namely an upper articulation 20 and a lower articulation 22.

Each spherical articulation 20, 22 has an outer ring 24, 26 for guiding and positioning purposes, which is fixed in the internal bore 16 of the bearing body 12.

The outer ring 24, 26 is of generally annular form, and has a cylindrical outer lateral surface 28, 30 such as to be received in a corresponding cylindrical housing formed in the internal bore 16 of the bearing body 12.

In the embodiment which is shown in FIGS. 1 to 3, the outer ring 24, 26 of each of the spherical articulations 20, 22 is fixed axially in its corresponding housing, being in engagement in a first direction against a radial shoulder face 32, 34 formed integrally with the bearing body 12, and in the opposite direction against an elastic ring 36, 38.

Each outer ring 24, 26 has a spherical inner surface 37, 39 in which an internal spherical bush 40, 42 is mounted, the latter being able to pivot about the centre C1, C2 of the spherical inner surface 37, 39 of the outer ring 24, 26. In accordance with the features of the invention, the drive spindle 14 is mounted eccentrically in the internal spherical bush 42 of the lower articulation 22, so that its axis A1 does not pass through the centre C2 of the articulation 22.

The drive spindle 14 is mounted in the internal spherical bush 42 through a splined portion 44 which prevents any relative rotation of the spindle 14 with respect to the internal spherical bush 42.

As can be seen from FIGS. 1 and 2, in a first position of the drive spindle 14, the axis A1 of the spindle 14 is disposed parallel to the axis A0 of the tubular body 12.

In this embodiment, the drive spindle 14 extends beyond both axial ends 46, 68 of the bearing body 12, and for this purpose sealing means are arranged to close off the bearing 12 transversely.

An annular seal is arranged at the upper end 46 of the bearing body 12, and has a flexible membrane 48, an outer periphery 50 of which is fixed on the upper axial end 46 of the bearing body 12, with an inner periphery 54 of the membrane bearing sealingly on the drive spindle 14.

The internal spherical bush 42 of the lower articulation 22 includes a cylindrical axial extension piece 56 which projects downwardly from the lower end 68 of the bearing body 12, the extension piece having a cylindrical passage 58 through which a free end portion 60 of the spindle 14 passes, the latter being adapted to be coupled, through a square driving end 62, to a crank 64 which lies at right angles to the axis A1.

The crank 64 is actuated by a motorised reduction gear unit (not shown), with a control linkage (not shown) being interposed.

In order to close off sealingly the lower axial end 68 of the bearing body 12, an annular seal is provided, comprising a flexible membrane 66 which is fixed through an outer periphery on the lower end of the bearing body 12, and which bears, through an inner periphery on the cylindrical outer surface 70 of the extension piece 56 of the internal spherical bush 42.

In addition, a seal 72 is arranged between the free end portion 60 of the spindle 14 and the axial extension piece 56 of the internal spherical bush 42.

As can be seen in the drawings, the internal spherical bush 40 of the upper articulation 20 is immobilised axially on the spindle 14, between an outer radial collar portion 74 of the spindle 14 and a resilient split ring 76 which is fitted in an annular groove 78 of the spindle 14.

FIG. 3 is a view similar to that in FIG. 1, in which the drive spindle has pivoted through 180 degrees about its axis A1 under the action of the crank 64, which is itself actuated by the linkage and the motorised reduction gear unit.

As can be seen in this Figure, as the spindle 14 rotates about its axis A1, it carries with it the internal spherical bush 42 of the lower articulation 22, which accordingly performs a rotational movement about its centre C2.

Since the centre C2 of the internal spherical bush is not situated on the axis A1 of the spindle 14, the internal spherical bush 42 imposes on the spindle 14 a rotational movement about the centre C2, which is fixed with respect to the bearing body 12 and therefore fixed with respect to the vehicle.

Similarly, the spindle 14 is put into rotational movement about the centre C1 of the internal spherical bush 40 of the upper articulation 20, but the centre C1 is, in this example, coincident with the axis A1 of the spindle 14.

As a result of this, and as a result of its rotational movement about its axis A1, the drive spindle 14 is put into rotational movement about the straight line which joins together the centre C1, C2 of the articulations 20, 22, so that the spindle 14 describes a conical motion in space, which produces a variation in the orientation of the axis A1 of the spindle 14 with respect to the axis A0 of the bearing body 12 which is fixed with respect to the vehicle.

The inclination of the axis A1 with respect to its initial position is at a maximum for a rotation of 180 degrees of the spindle 14, as is shown in FIG. 3, but, where the apparatus is fitted on a motor vehicle, the maximum angle of rotation may be less.

The membrane seals 48, 66, by deforming, maintain the sealing of the bearing 12 regardless of the position of the spindle 14.

Thanks to this design of the bearing 10, not only is a screen wiper fixed on the upper end 18 of the spindle 14 driven in a wiping movement about the axis A1 of the spindle, but it also pivots about the centre C1 of the upper articulation 20, which modifies its orientation with respect to the general direction of the bodywork panel and of the glass.

More precisely, the screen wiper tends to pivot about its longitudinal axis during its wiping motion.

The maximum value of the pivot angle varies according to the ratio between the distance separating the two centres C1, C2 of the articulations 20, 22 and the degree of eccentricity of the spindle 14 in the internal spherical bush 42 of the lower articulation 22.

Figure 4:
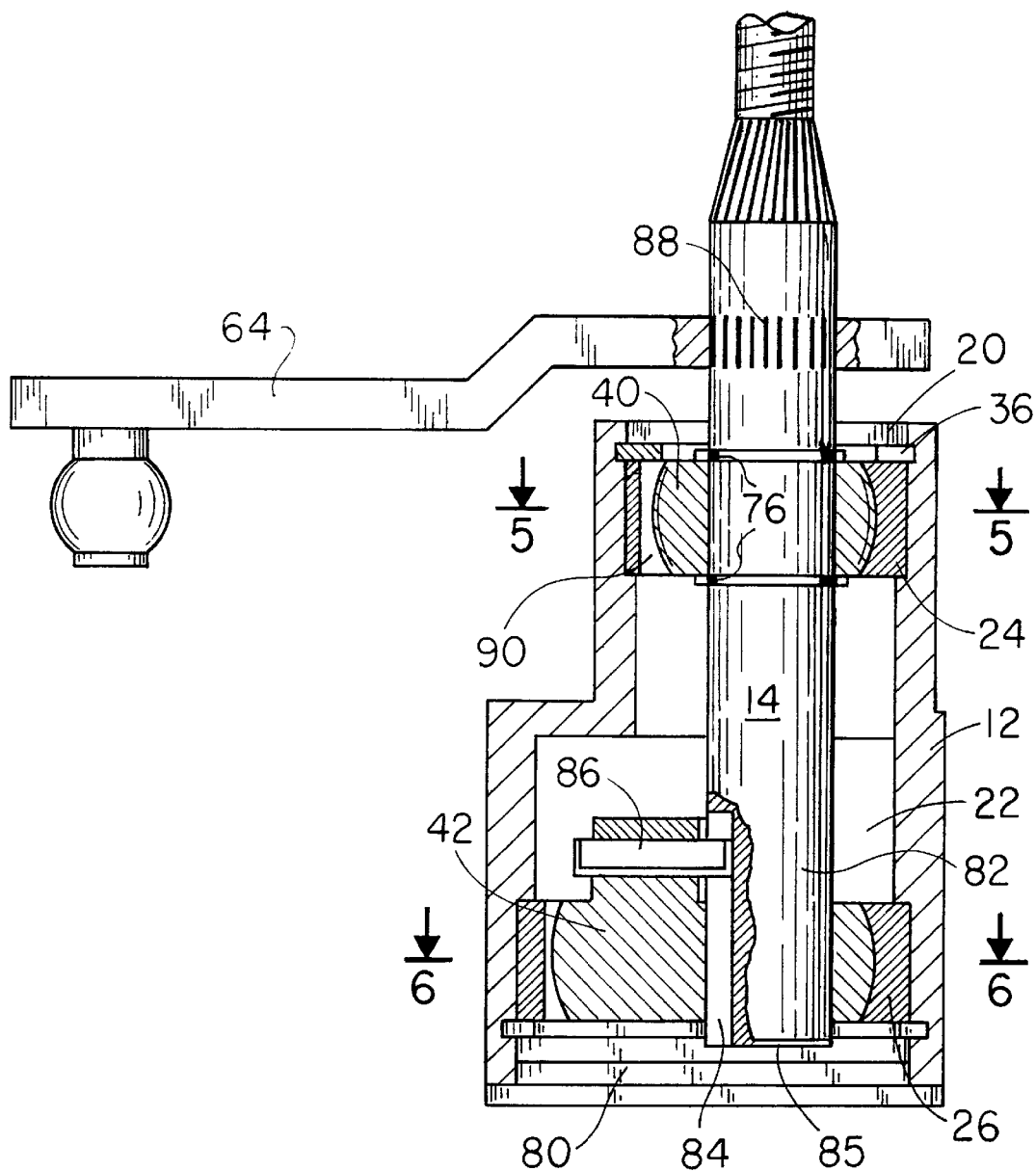
FIG. 4 is view in axial cross section of another embodiment of a bearing in accordance with the invention.
Figure 5:
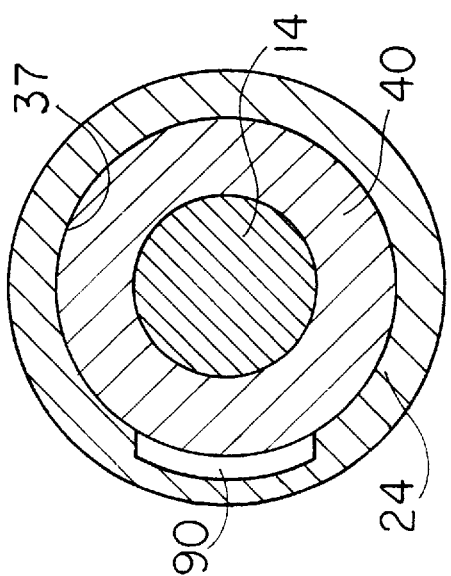
FIGS. 5 and 6 are views in transverse cross section taken on the respective lines 5—5 and 6—6 in FIG. 4.
Figure 6:
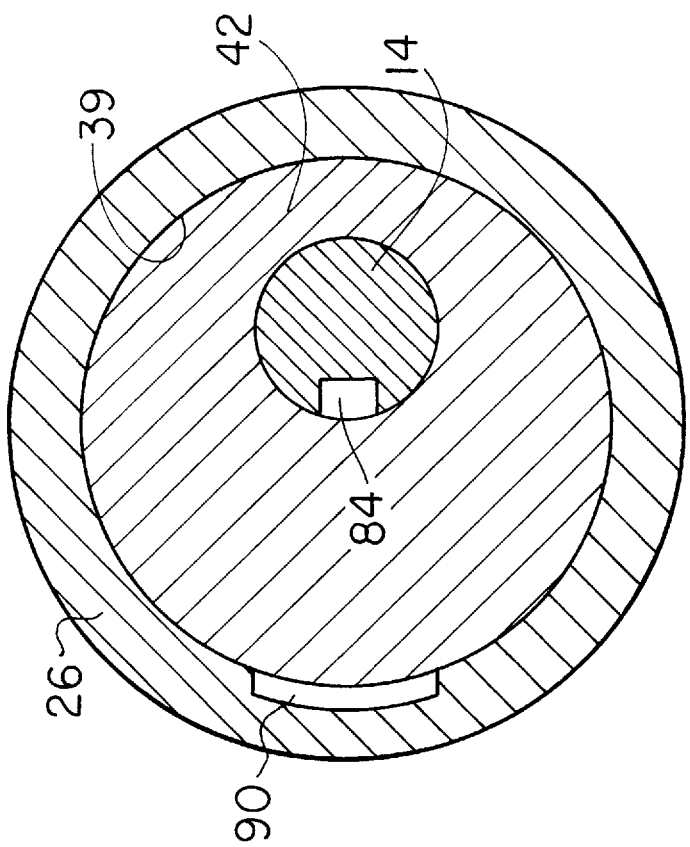

FIGS. 4 to 6 show a second embodiment of the invention, in which the crank 64 is fitted on the spindle 14, not at its lower end, but axially between the upper end portion 18 of the spindle 14 and the upper end 46 of the bearing body 12.

This embodiment avoids the situation in which the spindle 14 extends beyond both ends of the bearing body 12, so that the lower axial end 68 of the bearing 12 is accordingly closed by a transverse plate 80. In addition, the lower end portion 82 of the spindle 14 is not splined, but is provided with an axial groove 84 which is open in the lower terminal face 85 of the spindle 14, and which cooperates with a radial dowel 86 mounted in the internal spherical bush 42 of the lower articulation 22, so as to couple the spindle 14 in rotation with the internal spherical bush 42.

In addition, the internal spherical bush 40 of the upper articulation 20 is fixed axially on the spindle 14 by means of two resilient rings 76.

This form of construction for a bearing 10 also permits simple assembly of the whole.

In this connection, the lower articulation 22, having its radial dowel 86, is introduced axially into the lower end of the bearing body 12, which is then closed sealingly by the transverse plate 80.

The spindle 14, carrying the upper articulation 20 and the crank 64, the latter being fixed on the spindle 14 which for this purpose has a knutled portion 88, formed for example by rolling, is then introduced through the upper end 46 into the bearing body 12, and the lower end portion 82 of the spindle 14 is introduced into the lower spherical bush 42 of the lower articulation so as to bring the groove 84 into alignment with the radial dowel 86.

The upper articulation 20 is then fixed axially in the bearing body 12 by means of the elastic ring 36, the effect of which is also to prevent axial movement of the spindle 14.

The spherical articulations 20, 22 used in this second embodiment are formed with reliefs 90 located in the spherical internal surfaces 37, 39 of their outer rings 24, 26. These reliefs 90 given improved control of the operating clearances and contact pressures between the outer rings 24, 26 and the internal spherical bushes 40, 42.

In the embodiments shown in the drawings, the upper articulation 20 is centred on the axis A1 of the spindle 14, which enables the displacement of the upper end portion 18 of the spindle 14 during its rotational movement to be limited.

However, in some cases it can be desirable to make use of such a displacement in order better to adapt the trajectory of the screen wiper during its wiping movement.

An eccentric upper articulation 20 is then used. The value of the eccentricity may be different from that of the lower articulation 22, and the eccentricities of the two articulations 20, 22 can also be offset angularly.

I claim:

1. An improved screen wiper apparatus for sweeping a motor vehicle glass in which a screen wiper extends longitudinally in a direction parallel to a general plane of the glass to be swept, in which the screen wiper is mounted at an upper end of a drive spindle for driving the wiper in alternating rotary wiping movement, the drive spindle having an axis of rotation that is substantially at right angles to the general plane of the glass, in which the drive spindle is mounted for rotation in a bearing housing which is fixed with respect to the vehicle glass, and further in which the drive spindle is driven in rotation by a crank mounted thereon, said crank lies in a plane substantially at right angles to the axis of rotation of the spindle, and which is coupled through a linkage to a motorized reduction gear unit, wherein the improvement comprises:

first and second spherical articulations rotatably mounting the drive spindle in the bearing housing, the second spherical articulation having a centre of rotation eccentric with respect to the axis of rotation of the drive spindle, wherein the drive spindle is fixed to an internal spherical ring of the second articulation for rotation with the ring so that the orientation of the axis of rotation of the drive spindle varies with respect to the plane of the glass when the spindle is driven in rotation about its axis of rotation.

2. The apparatus according to claim 1, wherein the first spherical articulation is positioned so that the centre of rotation of the first articulation is coincident with the axis of rotation of the drive spindle.

3. The apparatus according to claim 2, wherein the bearing housing is positioned against an internal face of a bodywork panel of the vehicle, through which the upper end of the drive spindle passes, and wherein the first spherical articulation is disposed axially on the drive spindle in close proximity to the bodywork panel at an upper end of the bearing housing.

4. The apparatus according to claim 3, wherein the crank for driving the drive spindle in rotation is mounted on the drive spindle axially between the first spherical articulation and the bodywork panel.

5. The apparatus according to claim 4, wherein the bearing housing is closed at a lower axial end by a transverse wall.

6. The apparatus according to claim 1, wherein at least one axial end of the bearing housing is sealingly closed off transversely by an annular seal having a flexible membrane, an outer periphery of the membrane being fixed on the at least one axial end of the bearing housing and an inner periphery of the membrane co-operating sealingly with the drive spindle.

7. The apparatus according to claim 6, wherein the internal spherical ring of the second articulation has an axial extension piece which is directed towards the at least one axial end of the bearing housing, and wherein the membrane sealingly engages the axial extension piece.

8. The apparatus according to claim 1, wherein the bearing housing is substantially tubular, and wherein each of the spherical articulations includes an outer guiding ring fixed on an internal cylindrical surface of the bearing housing, together with an inner ring fixed to the drive spindle.

9. The apparatus according to claim 1, wherein the crank for driving the drive spindle in rotation is mounted on the drive spindle axially below the bearing housing.

10. The apparatus according to claim 9, wherein the bearing housing is closed at both axial ends by a membrane seal.

11. An article rotatably supporting a spindle capable of driving a screen wiper for a motor vehicle, said article comprising:

a housing having a bore for receiving the spindle;

first and second bearing members fixedly positioned within the bore of the housing, the bearing members each having a bearing surface along a longitudinal axis of the spindle;

a first support member in rotational contact with the bearing surface of the first bearing member, the first support member having a first bore receiving the spindle and adapted for rotation about a center of rotation thereof;

a second support member in rotational contact with the bearing surface of the second bearing member for rotation about a center of rotation thereof, the second support member having a second bore fixedly receiving the spindle, wherein the center of rotation of the second support member relative the second bearing member is eccentric with respect to the axis of the spindle so that upon rotation of the spindle about the spindle axis, the spindle axis rotates about the center of rotation of the second support member.

12. The apparatus according to claim 11, wherein the center of rotation of the first support member relative the first bearing member is coincident with the axis of the spindle.

* * * * *